United States Patent
Rodzevski et al.

(10) Patent No.: US 9,794,670 B2
(45) Date of Patent: Oct. 17, 2017

(54) BT AND BCC COMMUNICATION FOR WIRELESS EARBUDS

(71) Applicant: Sony Corporation, Tokyo (JP)

(72) Inventors: Aleksandar Rodzevski, Malmö (SE); Magnus Midholt, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 136 days.

(21) Appl. No.: 14/521,048

(22) Filed: Oct. 22, 2014

(65) Prior Publication Data

US 2016/0119708 A1    Apr. 28, 2016

(51) Int. Cl.
| | |
|---|---|
| *H04R 1/10* | (2006.01) |
| *H04B 13/00* | (2006.01) |
| *H04M 1/60* | (2006.01) |
| *H04M 1/05* | (2006.01) |

(52) U.S. Cl.
CPC ......... *H04R 1/1041* (2013.01); *H04B 13/005* (2013.01); *H04M 1/6066* (2013.01); *H04M 1/05* (2013.01); *H04M 2250/02* (2013.01); *H04R 2420/07* (2013.01)

(58) Field of Classification Search
CPC  H04R 1/1041; H04R 2420/07; H04R 25/552; H04R 25/554; H04R 25/606; H04M 1/05; H04M 2250/02
USPC .......................................... 381/74, 23.1, 151
See application file for complete search history.

(56) References Cited

U.S. PATENT DOCUMENTS

| | | |
|---|---|---|
| 6,580,356 B1 | 6/2003 | Alt et al. |
| 7,202,773 B1 | 4/2007 | Oba et al. |
| 2005/0008148 A1 | 1/2005 | Jacobson |
| 2005/0243061 A1 | 11/2005 | Liberty et al. |

(Continued)

FOREIGN PATENT DOCUMENTS

| | | |
|---|---|---|
| EP | 1 482 715 | 12/2004 |
| EP | 2018038 | 1/2009 |

(Continued)

OTHER PUBLICATIONS

International Search Report for corresponding International Application No. PCT/162015/052929, mailed Jul. 23, 2015.
Bionym, "The Nymi White Paper", Nov. 19, 2013.

*Primary Examiner* — Vivian Chin
*Assistant Examiner* — Douglas Suthers
(74) *Attorney, Agent, or Firm* — Renner, Otto, Boisselle & Sklar, LLP (57) ABSTRACT

Devices and methods for controlling the functionality of a pair of earbuds. The first earbud establishes a connection between the first earbud and an electronic device, searches for the second earbud of the pair of earbuds using Body Coupled Communication, BCC, and sends a signal from the first earbud to the electronic device including information defining whether the first earbud detected the second earbud during the search. The electronic device receives a signal from the at least one of the earbuds, the signal comprising information defining whether the earbud has detected the other earbud of the pair of earbuds using Body Coupled Communication, BCC, and sends a signal to the at least one earbud wherein the signal is controlled based on the received signal and includes information associated with controlling the functionality of the pair of earbuds.

11 Claims, 7 Drawing Sheets

(56) References Cited

U.S. PATENT DOCUMENTS

| | | | |
|---|---|---|---|
| 2006/0252371 A1 | 11/2006 | Yanagida | |
| 2007/0145119 A1 | 6/2007 | Rhelimi | |
| 2007/0147629 A1* | 6/2007 | Chiloyan | H04R 1/1033 381/74 |
| 2007/0282783 A1 | 12/2007 | Singh | |
| 2009/0094681 A1 | 4/2009 | Sadler et al. | |
| 2010/0189272 A1* | 7/2010 | Song | H04M 1/6058 381/58 |
| 2010/0277435 A1 | 11/2010 | Han et al. | |
| 2011/0205156 A1 | 8/2011 | Gomez et al. | |
| 2012/0026129 A1 | 2/2012 | Kawakami | |
| 2012/0155649 A1 | 6/2012 | Posa | |
| 2012/0249409 A1 | 10/2012 | Toney et al. | |
| 2012/0324368 A1 | 12/2012 | Putz et al. | |
| 2013/0017789 A1 | 1/2013 | Chi et al. | |
| 2013/0174049 A1 | 7/2013 | Townsend et al. | |
| 2013/0279724 A1* | 10/2013 | Stafford | H04R 1/1041 381/309 |
| 2014/0085050 A1 | 3/2014 | Luna | |

FOREIGN PATENT DOCUMENTS

| | | |
|---|---|---|
| EP | 2378748 | 10/2011 |
| EP | 2600319 | 6/2013 |
| JP | 2008 073462 | 4/2008 |
| JP | 2009 049951 | 3/2009 |
| WO | 2008/113053 | 9/2008 |
| WO | 2011/021531 | 2/2011 |

\* cited by examiner

BT AND BCC COMMUNICATION FOR WIRELESS EARBUDS

TECHNICAL FIELD

The disclosure pertains to the field of controlling the functionality of a pair of earbuds. In particular it discloses devices and methods for controlling the functionality of the earbuds.

BACKGROUND ART

Earpieces, earbuds, headsets, headphones or other hands-free solutions are commonly utilized to keep the sound private and/or to facilitate multitasking when listening to music, talking in the phone, getting body function updates from your wristlet etc. Due to the rapid development of new electronic devices, e.g. mp3 players, tablets, smart phones, wearables, etc., where the sound experience plays an important role, the technique for transmittal of sound to the earpieces has undergone major improvements.

Conventional headphones or earpieces are generally wired to audio devices. However, such systems are not really convenient for the user. For example, the wires disturb the user because she/he cannot move as freely as usual and the wires also have a tendency to end up in a tangle. Moreover, there is a risk of breaking the wires or any of its contacts, which makes the complete headset unusable.

For some time, wires can be avoided by utilizing different kinds of short range wireless solutions, also referred to as Personal Area Network (PAN) solutions. Examples are; Blue-Tooth® (BT), infrared Data Association (IrDA), ZigBee®, Ultra WideBand (UWB), etc.

Known devices and methods of controlling data transfer between portable electronic devices, by wire or wirelessly, are relatively straight-forward for a user of mobile devices and wearables, such as mobile telephones, headphones, headsets, microphones, speakers and/or wristlets. There is an increasing demand in the audio and mobile phone market for even more easy, quick and user-friendly ways of using a mobile phone or other portable electronic device and wearable communication devices, e.g. headsets.

With increased functionality of earpieces often comes increased development cost, both for the hardware and software. Furthermore, increased hardware also leads to bulkier earpieces.

Increased hardware and/or more advanced software may also lead to decreased battery time for wireless earpieces.

In summary, there is a need to reduce development cost for earpieces, reduce bulkiness, decrease battery consumption and to increase their usefulness to users.

SUMMARY OF THE INVENTION

With the above description in mind, then, an aspect of the present invention is to provide devices and methods for changing the functionality of a pair of earbuds depending on how they are currently used, which seek to mitigate, alleviate, or eliminate one or more of the above-identified deficiencies in the art and disadvantages singly or in any combination.

These and further objects are achieved by devices and methods equipped with, and utilizing Body coupled communication, BCC, technology.

The disclosure provides for methods and devices for controlling the functionality of the pair of earbuds.

The present disclosure is defined by the appended claims. Various advantageous embodiments of the disclosure are set forth by the appended claims as well as by the following description and the accompanying drawings.

According to some aspects the disclosure provides for a method, performed in a first earbud of a pair of earbuds.

According to some aspects, the method comprises the steps of establishing a connection between the first earbud and an electronic device, searching for the second earbud of the pair of earbuds using Body Coupled Communication, BCC, and sending a signal from the first earbud to the electronic device, the signal comprising information defining whether the first earbud detected the second earbud during the search. Thus, the first earbud uses BCC to check if the other earbud is on the body of the user and sends the result to a connected electronic device, such as a smartphone. The method provides for an efficient way to see if the user is using both earbuds in a pair of earbuds and provides information to a connected device so that that device may send a signal that depends on the information.

According to some aspects, the step of establishing a connection between the first earbud and an electronic device comprises that the connection is a Bluetooth connection or BCC connection. Thus, the functionality is increased when the earbuds are wireless earbuds.

According to some aspects, the method comprises the step of detecting, using a body recognizing sensor, direct contact between the first earbud and the body of a user of the first earbud. It is then possible to recognize when the first earbud is inserted into the ear of a user. The earbud may be in an idle state to save battery until it is detected that it is inserted. According to some aspects the earbud receives a signal from the electronic device but does not play until inserted in the ear of a user to save battery.

According to some aspects, the earbud that first detects contact is the first earbud. In other words, according to some aspects both earbuds of the pair of earbuds can perform the method according to this disclosure.

According to some aspects, the earbud that is detected first is the first earbud which acts as a BCC master and the second earbud acts as a BCC client.

According to some aspects, the second earbud will act as a BCC master if the direct contact between the first earbud and the body of the user is broken. Hence, if the user removes the first earbud from an ear the functionality of the first earbud will be transferred to the second earbud and thus the user does not need to remember which earbud to keep inserted to keep the first earbud.

According to some aspects, the method comprises the steps of receiving from the electronic device, a signal comprising information associated with the functionality of the pair of earbuds and controlling the functionality of the pair of earbuds based on the received signal from the electronic device. In other words, the functionality of the pair of earbuds is set based on a signal from the electronic device. The signal from the electronic device is in turn based on the information from the first earbud whether the first and/or the second earbuds are present on the body of the user.

According to some aspects the disclosure provides for a method performed in an electronic device, for controlling the functionality of a pair of earbuds.

According to some aspects, the method comprises the steps of: establishing a connection between the electronic device and at least one of the earbuds, receiving, in the electronic device, a signal from the at least one of the earbuds, the signal comprising information defining whether the earbud has detected the other earbud of the pair of earbuds using Body Coupled Communication, BCC, and sending a signal to the at least one earbud wherein the signal is controlled based on the received signal and comprises information associated with controlling the functionality of the pair of earbuds. In other words, the electronic device receives a message from one of the earbuds with information regarding of the earbud has found the other earbud or not. Since BCC is used this is an indication whether the earbuds are both present on the body of a user, i.e. inserted in the ears of a user. The electronic device then controls the signal sent to the earbud based on this information, i.e. the signal is controlled to optimize the functionality of the earbuds.

According to some aspects, the step of establishing a connection comprises establishing a connection via Bluetooth or Body Coupled Communication. Again, the functionality is increased when the earbuds are wireless earbuds. BCC may be used to decrease the battery consumption of the connection.

According to some aspects, the functionality of the pair of earbuds comprises that the first earbud receives a stereo audio signal, decodes the signal into two channels of which one sent to a speaker in the first earbud and the other is sent to the second earbud using BCC. In other words, the functionality is set to be the same as for a pair of headphones for reproducing sound but the channel sent to the second earbud is sent using BCC. Sending the signal using BCC is power saving. If the second earbud is only equipped with BCC technology and not for example Bluetooth it is also cost efficient since BCC technology is much cheaper.

According to some aspects, the functionality of the pair of earbuds comprises that the first earbud or second earbud reproduces sound from a received signal in mono. If only one earbud is inserted, power is saved by only reproducing sound in one of the earbuds.

According to some aspects, the functionality of the pair of earbuds comprises that the first earbud receives a mono audio signal and sends it to a speaker in the first earbud and the second earbud converts sound into a signal that is sent to the first earbud using BCC, the first earbud sends the signal on to the electronic device, whereby the first and the second earbud forms a headset. So the earbuds can be used as a headset by using one of the earbuds as a speaker.

According to some aspects, the functionality of the pair of earbuds comprises that the second earbud receives a mono audio signal and sends it to a speaker in the second earbud and the first earbud converts sound into a signal that is sent to the second earbud using BCC, the second earbud sends the signal on to the electronic device, whereby the first and the second earbud forms a headset. So, same as before, the earbuds can be used as a headset by using one of the earbuds as a speaker.

According to some aspects the disclosure provides for a first earbud of a pair of wireless earbuds, for controlling the functionality of the pair of earbuds.

According to some aspects, the first earbud comprises communication circuitry for short distance communication and processing circuitry. The processing circuitry is configured to establish a connection, using the communication circuitry, between the first earbud and an electronic device, to search for the second earbud of the pair of earbuds using Body Coupled Communication, BCC, of the communication circuitry and to send a signal, using the communication circuitry, from the first earbud to the electronic device, the signal comprising information defining whether the first earbud detected the second earbud during the search. Thereby, a first earbud that utilizes BCC for searching for the second earbud of the pair and sends the information to a connected electronic device is provided.

According to some aspects, the processing circuitry is configured to receive from the electronic device, a signal, using the communication circuitry, comprising information associated with the functionality of the pair of earbuds and to control (S6) the functionality of the pair of earbuds based on the received signal from the electronic device.

According to some aspects the disclosure provides for an electronic device, for controlling the functionality of a pair of earbuds.

According to some aspects, the electronic device comprises communication circuitry for short distance communication and processing circuitry. The processing circuitry is configured to establish a connection, using the communication circuitry, between the electronic device and at least one of the earbuds, to receive, in the electronic device, a signal, using the communication circuitry, from the at least one of the earbuds, the signal comprising information defining whether the earbud has detected the other earbud of the pair of earbuds using Body Coupled Communication, BCC, and to send a signal, using the communication circuitry, to the at least one earbud wherein the signal is controlled based on the received signal and comprises information associated with controlling the functionality of the pair of earbuds. Thereby, an electronic device for controlling the functionality of the earbuds is provided.

With the above description in mind, aspects of the present disclosure overcome at least some of the disadvantages of known technology as previously described.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

It should be added that the following description of the aspects/embodiments is for illustration purposes only and should not be interpreted as limiting the disclosure exclusively to these embodiments/aspects.

DETAILED DESCRIPTION

Aspects of the present disclosure will be described more fully hereinafter with reference to the accompanying drawings. The devices and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the present invention will be exemplified using an electronic device such as a mobile communication device such as a mobile phone. However, it should be appreciated that the invention is as such equally applicable to electronic devices which have touch detection capabilities. Examples of such devices may for instance be any type of mobile phone, smartphone, laptop (such as standard, ultra portables, netbooks, and micro laptops) handheld computers, portable digital assistants, tablet computers, touch pads, gaming devices, accessories to mobile phones, e.g. wearables in the form of headphones/-sets, visors/goggles, bracelets, wristbands, necklaces, etc. For the sake of clarity and simplicity, the embodiments outlined in this specification are exemplified with, and related to, mobile phones, tablets, headphones and head, neck and arm wearables only.

The term earbud is herein used as an electronic device that is held in place close to a user's ears and at least comprising loudspeakers. The earbuds may be both in-ear versions or sit on the ear with any kind of holder to hold it in place.

The terms wearable and wearable device are used interchangeably and is referring to a wireless device which is worn somewhere on the body of a user. Examples of wearables are watches, wristbands, headsets, headbands, necklaces, necklace-headsets etc.

The term short distance communication refers to any communication with a range limited to about 10 meters. Examples of short distance communication are Body coupled Communication, WiFi, Infrared, ZigBee, Bluetooth and Bluetooth Low Energy.

Body Coupled Communications, BCC, also referred to as Body Based Communication, BBC, or Near Body Communication, NBC, has been proposed as a promising alternative to radio frequency, RF, communication as a basis for Body/Personal Area Network, BAN/PAN, communication. A Body Area Network, BAN, or in other words a Personal Area Network, PAN, is a network with at least two devices communicating through a human body. In other words, BCC allows for an exchange of information between a plurality of devices which are in contact with or in close proximity of a living body. This can be achieved by the transmitting BCC-/BAN-antenna that provides a capacitive or galvanic coupling of low-energy electrical fields onto the body surface, i.e. leakage currents with a small magnitude is set to spread out over the human body. The small currents are then detected by a receiver BCC-/BAN-antenna, located on the same body. Thus, signals are conveyed over the body instead of through the air. As such, the communication is confined to the volume close to the body in contrast to RF communications, where a much larger volume is covered. Therefore, communication is possible between devices situated on, connected to, or placed close to the body. The power consumption of BCC-/BAN-antennas is very low which means that the BCC antennas can be turned on the entire time.

BCC is no new technique, and it has previously been employed within the fields of e.g. medical sensor devices and exercise sensors. Within these fields, sensors attached to the users skin or worn in the close proximity of the body is employed for monitoring different body functions in order to keep track of medical status or fitness parameters of the user. To send the collected data to a central unit e.g. BCC/BBC can be utilized.

Figure 1A:
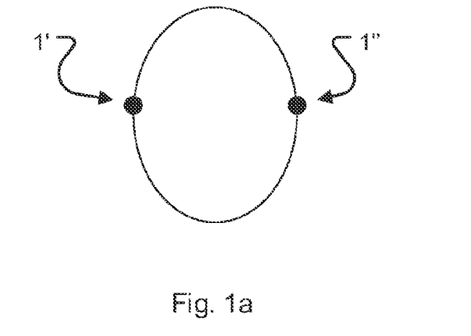
FIG. 1a-i illustrates different examples of a user using earbuds with different designs.
Figure 1B:
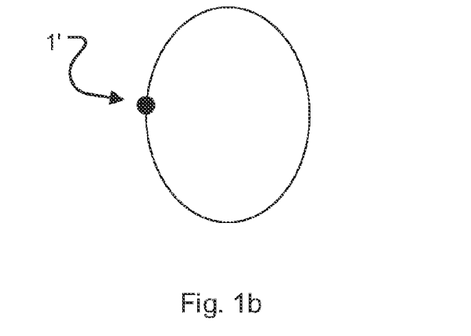
Figure 1C:
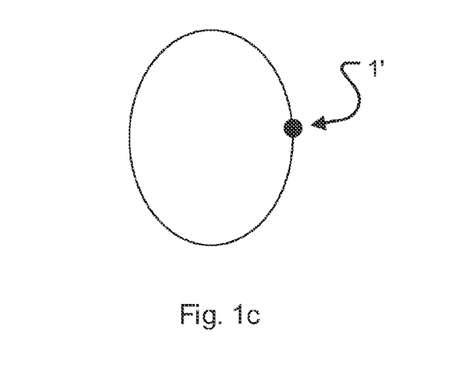
Figure 1D:
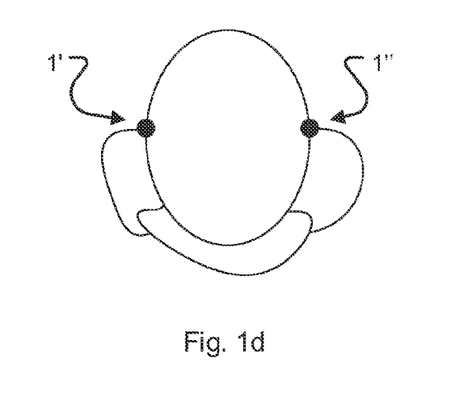
Figure 1E:
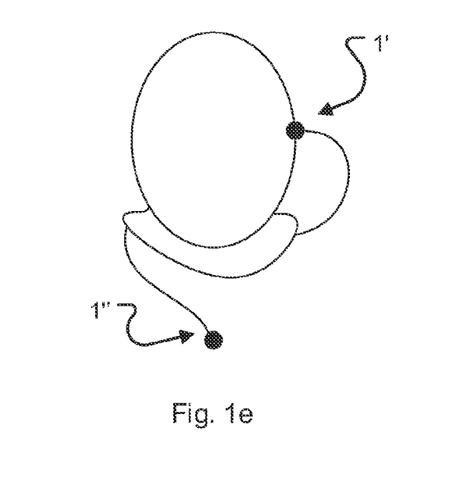
Figure 1F:
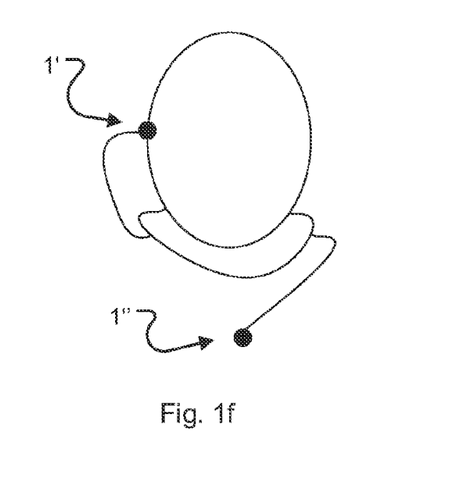
Figure 1G:
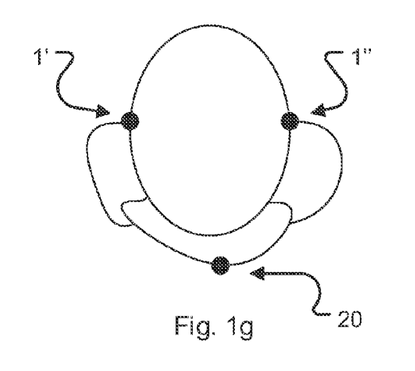
Figure 1H:
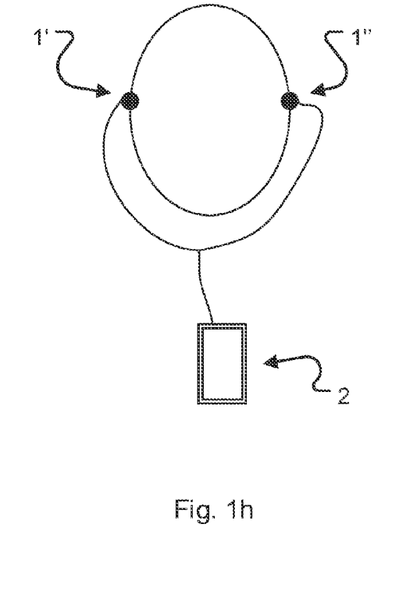
Figure 1I:
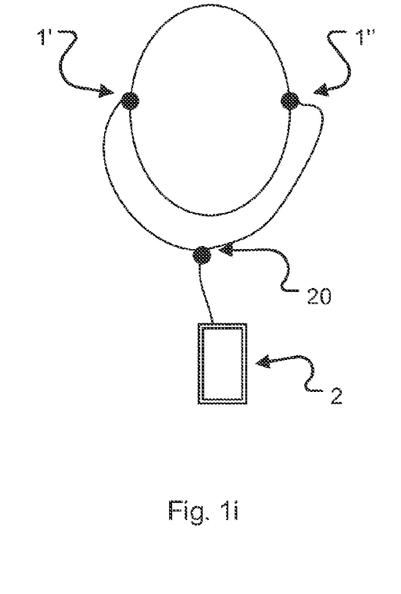

As discussed in the summary, the disclosure provides for methods and devices for controlling the functionality of the pair of earbuds 1', 1". The functionality of the earbuds is controlled, i.e. changed because of various different ways to use the earbuds. Examples of different use cases are illustrated in FIGS. 1a to 1i. FIG. 1a shows a user wearing two wireless earbuds. FIGS. 1b and 1c shows a user wearing only one earbud in the left and the right ear respectively. FIGS. 1d to 1g shows a user wearing earbuds that are connected to each other via wire that is worn on the user around the neck and in FIGS. 1e and 1f one of the earbuds is inserted in the ear of the user and one is hanging by the wire. In this case, according to some aspects of the disclosure, the earbud hanging by the wire may act as a microphone while the other earbud acts as a speaker. FIG. 1g shows a case where there is a separate microphone 20 on the necklace. In FIGS. 1a to 1g the earbuds are wirelessly connected to an electronic device 2. In the last two figures the earbuds are connected to a smartphone with a wire with and without a separate microphone. In the case without a microphone one of the earbuds functions as a microphone according to some aspects of the disclosure.

Again, the figures show different use cases of a pair of earbuds and depending on the use case, the optimal functionality of the earbuds may change. For example in the case of 1a, both earbuds will play an audio signal received wirelessly from an electronic device but in case of FIG. 1c only the left earbud needs to play the signal and the second earbud 1" can remain idle and thus save battery.

FIGS. 2a to 2d shows some aspects of the disclosure where the user is using earbuds 1', 1", an electronic device 2 and a wearable. The wearable is shown as a watch but may be any type of wearable such as a necklace or goggles. According to some aspects the wearable is the electronic device according to the disclosure. That is, the wearable is the electronic device 2 that communicates with the earbud(s).

Figure 3:
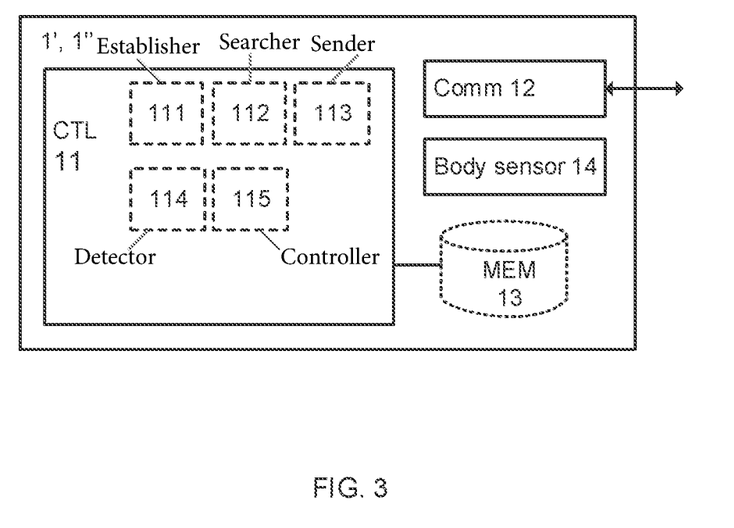
FIG. 3 illustrates an example of an earbud.

According to some aspects the disclosure provides for a method, performed in a first earbud 1' of a pair of earbuds 1', 1", and a first earbud 1', for controlling the functionality of the pair of earbuds 1', 1". As can be seen in FIG. 3, the first earbud comprises communication circuitry 12 for short distance communication, processing circuitry 11 and memory 13 for storing data.

Figure 4:
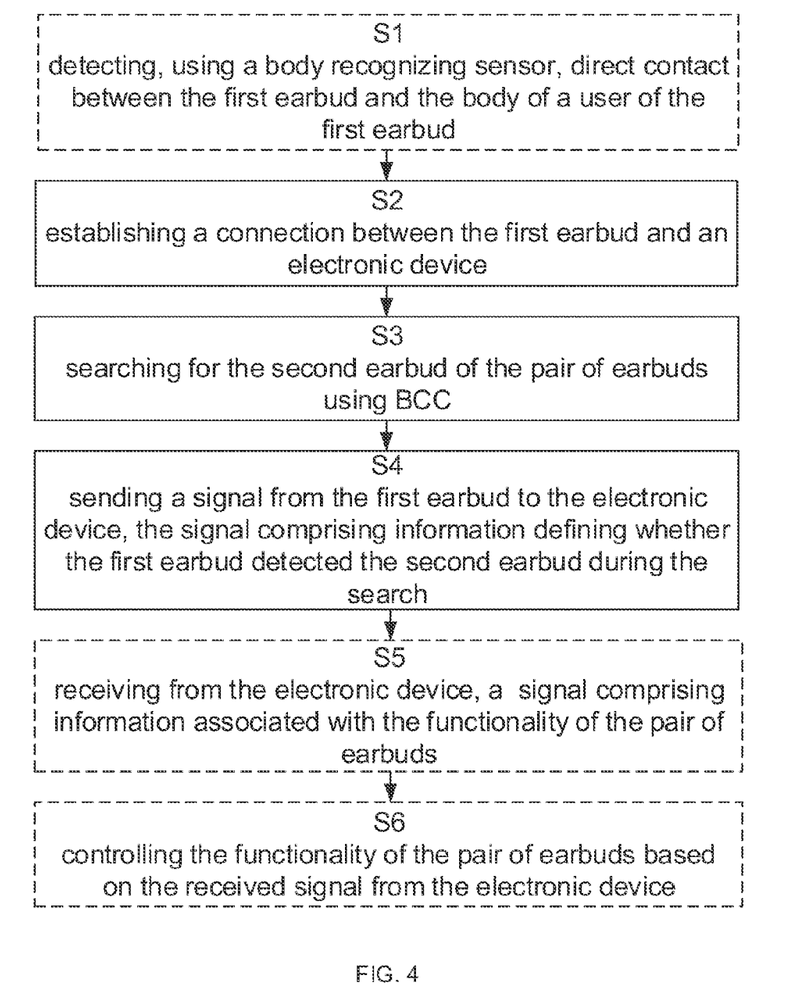
FIG. 4 is a flow chart illustrating the proposed method, performed in the first earbud.

FIG. 4 is a flow diagram depicting example operations which may be taken by the earbud of FIG. 3.

It should be appreciated that FIG. 4 comprise some operations which are illustrated with a solid border and some operations which are illustrated with a dashed border. The operations which are comprised in a solid border are operations which are comprised in the broadest example embodiment. The operations which are comprised in a dashed line are example embodiments which may be comprised in, or a part of, or are further operations which may be taken in addition to the operations of the broader example embodiments. It should be appreciated that the operations need not be performed in order. Furthermore, it should be appreciated that not all of the operations need to be performed.

According to some aspects, the method of the first earbud comprises the step of establishing S2 a connection between the first earbud and an electronic device 2. The processing circuitry 12 is configured to establish the connection, using the communication circuitry 11, between the first earbud and an electronic device. According to some aspects the processing circuitry comprises an establisher 111 for establishing the connection. The connection is ether a wireless or wired connection.

According to some aspects, the connection between the first earbud and an electronic device 2 comprises that the connection is a Bluetooth connection or BCC connection. Thus, the functionality is increased when the earbuds are wireless earbuds. In other words, the first earbud is equipped with Bluetooth and/or BCC technology.

It should be noted that within this document, the term Bluetooth is used for both Bluetooth and Bluetooth Low Energy, BLE. At present it is not possible to use BLE to send audio signals but the plan is to include this in the 2016 release of BLE.

The method of the first earbud also comprises the step of searching S3 for the second earbud 1″ of the pair of earbuds using Body Coupled Communication, BCC. The processing circuitry 11 is configured to search for the second earbud of the pair of earbuds using Body Coupled Communication, BCC, of the communication circuitry. According to some aspects the processing circuitry comprises a searcher 112 for the search.

The method of the first earbud also comprises the step of sending S4 a signal from the first earbud to the electronic device, the signal comprising information defining whether the first earbud detected the second earbud during the search. The processing circuitry 11 is configured to send the signal, using the communication circuitry, from the first earbud to the electronic device, the signal comprising information defining whether the first earbud detected the second earbud during the search. According to some aspects the processing circuitry comprises sender 113 for sending the signal.

In other words, the first earbud uses BCC to check if the other earbud is on the body of the user and sends the result to a connected electronic device, such as a smartphone. The method provides for an efficient way to see if the user is using both earbuds in a pair of earbuds and provides information to a connected device so that that device may send a signal that depends on the information. When the first earbud detects the second earbud during the search it is a good indication that both earbuds are used by the user. Since the search is performed using BCC both earbuds are at least in close proximity to the user's body if the first earbud finds the second earbud. According to some aspects, close proximity is within 2 cm. According to some aspects, close proximity is within 3 cm. According to some aspects, close proximity is within 4 cm. According to some aspects, close proximity is within 7 cm. How close the earbuds need to be to the human body to be able to use BCC depends on the BCC technology used. When the first earbud finds the second earbud using BCC it is assumed that the user intends to use both earbuds, i.e. not the case of FIGS. 1b, 1c, 2c and 2d. Thereby, a first earbud that utilizes BCC for searching for the second earbud of the pair and sends the information to a connected electronic device is provided.

The first earbud comprises at least one sensor or electrode or antenna in the communication circuitry 12 adapted for BCC.

According to some aspects, the method comprises the step of detecting 51, using a body recognizing sensor 14, direct contact between the first earbud and the body of a user of the first earbud. According to some aspects the processing circuitry is configured to detect 51 the direct contact. According to some aspects the processing circuitry comprises a detector 114. It is then possible to recognize when the first earbud is inserted into the ear of a user. The earbud may be in an idle state to save battery until it is detected that it is inserted. According to some aspects the earbud receives a signal from the electronic device but does not play until inserted in the ear of a user to save battery. The detection may be performed using a BCC electrode in the earbud. The detection may also be performed using an electrode separate of the BCC technology. The detection may be performed by a capacitive sensor, an IR-detector or a temperature sensor or any sensor capable of detecting direct contact with a human body.

According to some aspects, the earbud that first detects contact to a body of a user is the first earbud. In other words, according to some aspects both earbuds of the pair of earbuds can perform the method according to this disclosure. In the case where the communication between the first earbud and the electronic device 2 is performed using Bluetooth both earbuds of the pair of earbuds are equipped with Bluetooth. According to some aspects the role of the first and the second earbud may switch during usage. This is useful for when the first earbud, which receives a signal from the electronic device and sends a signal to the second earbud, starts to run out of power. The second earbud will consume less power since it will only act as a receiver. The role of the first earbud may then be switched so that the second earbud becomes the first earbud and the pair of earbuds will function for a longer time than if only one earbud can be the first earbud.

Streaming audio over Bluetooth consumes around 10 mA, depending on decoding and time divisions. The current BCC technology uses around 7 mA. However, it is expected that coming generations of BCC technology will consume less energy.

According to some aspects, the earbud that is detected first is the first earbud which acts as a BCC master and the second earbud acts as a BCC client. In the case where the role of first and second earbud may change, the BCC master and BCC client also changes.

According to some aspects, the second earbud will act as a BCC master if the direct contact between the first earbud and the body of the user is broken. Hence, if the user removes the first earbud from an ear the functionality of the first earbud will be transferred to the second earbud and thus the user does not need to remember which earbud to keep inserted to keep the first earbud. This requires that the second earbud can communicate with the electronic device, either via Bluetooth or BCC.

An advantage with only using BCC for the communication is that BCC technology is cheap and will reduce the manufacturing cost of the earbuds. According to one aspect the first earbud is equipped with Bluetooth for communication with the electronic device and with BCC for communication with the second earbud and the second earbud is only equipped with BCC for communication with the first earbud.

According to some aspects, the method comprises the step of receiving S5 from the electronic device, a signal comprising information associated with the functionality of the pair of earbuds. The processing circuitry 11 is configured to receive S5, using the communication circuitry, the signal. According to some aspects the processing circuitry comprises a receiver 115 for receiving the signal. According to some aspects, the method comprises the step controlling S6 the functionality of the pair of earbuds based on the received signal from the electronic device. The processing circuitry 11 is configured to control S6 the functionality. According to some aspects the processing circuitry comprises a controller 115 for controlling the functionality. In other words, the functionality of the pair of earbuds is set based on a signal from the electronic device. The signal from the electronic device is in turn based on the information from the first earbud whether the first and/or the second earbuds are present on the body of the user. According to some aspects, the signal comprises information instructing the earbud on how to set the functionality of the earbuds. According to some aspects, the signal is an audio signal in stereo or mono; stereo being an indication that the earbuds should both function as speakers for the audio signal and mono to indicate that one of them shall function as a speaker.

Figure 5:
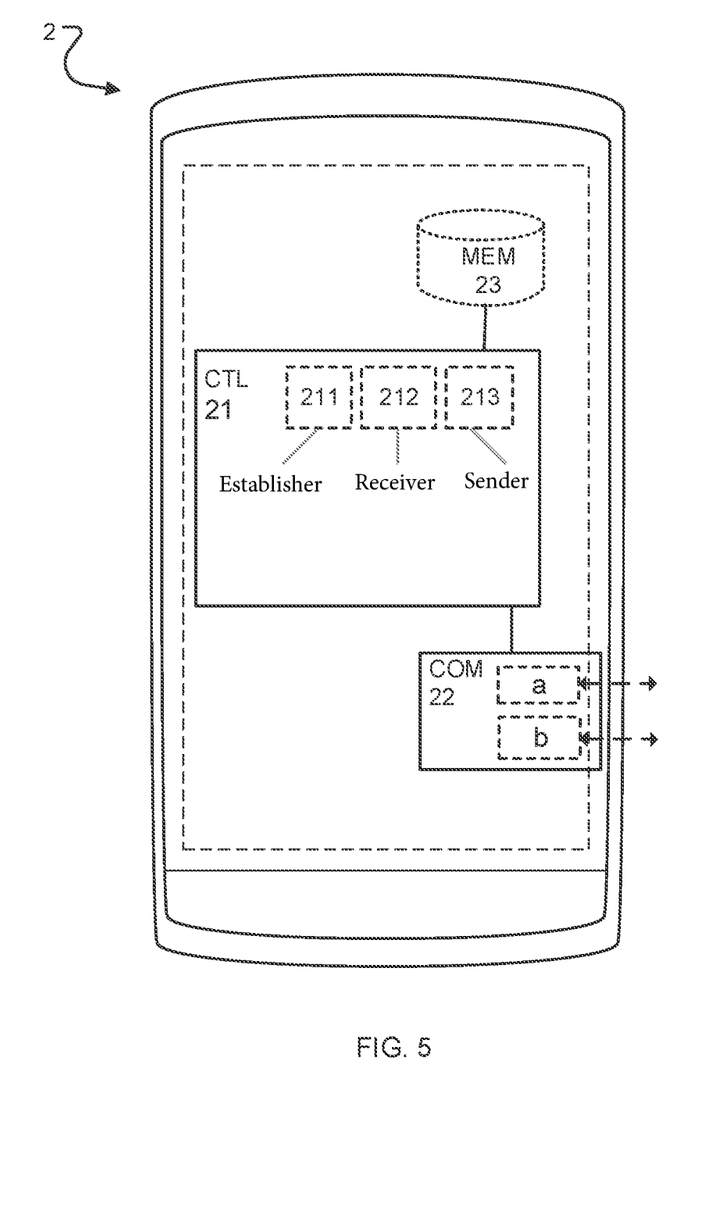
FIG. 5 illustrates an example of an electronic device.

According to some aspects the disclosure provides for a method performed in an electronic device 2, for controlling the functionality of the pair of earbuds 1', 1". As can be seen in FIG. 5, the electronic device comprises communication circuitry 22 for short distance communication and processing circuitry 21.

Figure 6:
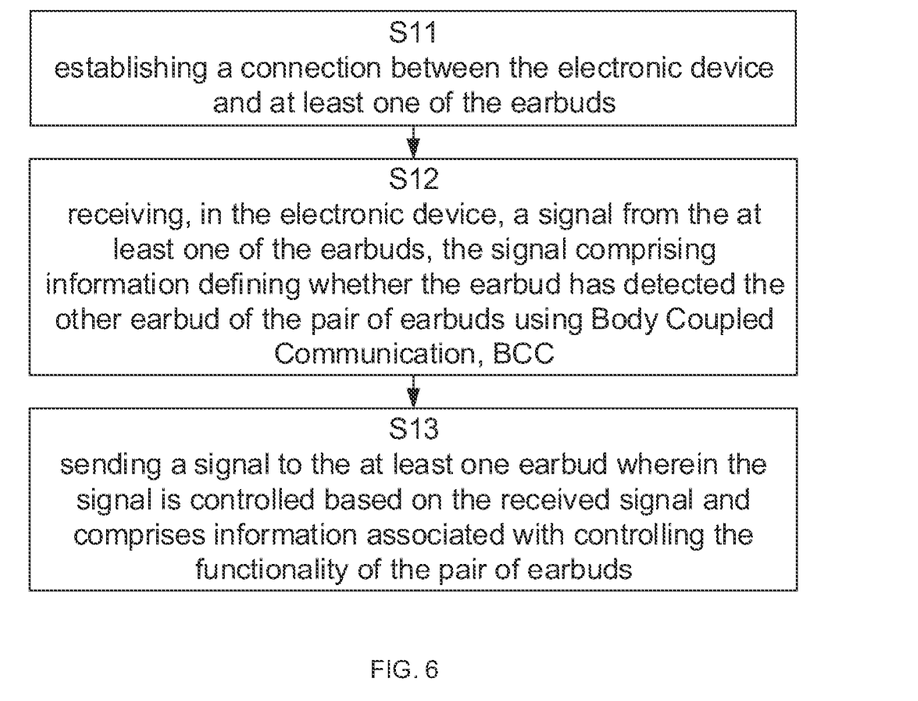
FIG. 6 is a flow chart illustrating the proposed method, performed in the electronic device.

FIG. 6 is a flow diagram depicting example operations which may be taken by the electronic device of FIG. 5.

It should be appreciated that FIG. 6 comprise some operations which are illustrated with a solid border and some operations which are illustrated with a dashed border. The operations which are comprised in a solid border are operations which are comprised in the broadest example embodiment. The operations which are comprised in a dashed line are example embodiments which may be comprised in, or a part of, or are further operations which may be taken in addition to the operations of the broader example embodiments. It should be appreciated that the operations need not be performed in order. Furthermore, it should be appreciated that not all of the operations need to be performed.

According to some aspects, the method of the electronic device comprises the steps of establishing S11 a connection between the electronic device and at least one of the earbuds. The processing circuitry 21 is configured to establish S11 the connection, using the communication circuitry, between the electronic device and at least one of the earbuds. According to some aspects, the processing circuitry comprises an establisher 211 for establishing the connection.

According to some aspects, the step of establishing S11 a connection comprises establishing a connection via Bluetooth or Body Coupled Communication. Again, the functionality is increased when the earbuds are wireless earbuds. In other words, the electronic device is equipped with Bluetooth and/or BCC technology. An advantage with using BCC between the electronic device and the first earbud is that the signal is very locally sent, it is not sent with a radio frequency so that it may disturb other signals and if the earbuds are used as a headset, the information being sent is very hard to listen in to; it would require direct contact with the body of the user of the earbuds and the electronic device.

According to some aspects, the method of the electronic device comprises the step of receiving S12, a signal from the at least one of the earbuds, the signal comprising information defining whether the earbud has detected the other earbud of the pair of earbuds using Body Coupled Communication, BCC. The processing circuitry 21 is configured to receive S12 the signal from the at least one of the earbuds using the communication circuitry 22. According to some aspects the processing circuitry comprises a receiver 212 for receiving the signal. The electronic device is in this way informed if the first earbud has detected the second earbud, which is an indication whether both earbuds are used by the user or not. The electronic device uses the information to determine what functionality is optimal for the earbuds.

According to some aspects, the method of the electronic device comprises the step of sending S13 a signal to the at least one earbud wherein the signal is controlled based on the received signal and comprises information associated with controlling the functionality of the pair of earbuds. The processing circuitry 21 is configured to send the signal using the communication circuitry 22. According to some aspects the processing circuitry comprises a sender 213 for sending the signal. In other words, the electronic device receives a message from one of the earbuds with information regarding of the earbud has found the other earbud or not. Since BCC is used this is an indication whether the earbuds are both present on the body of a user, i.e. inserted in the ears of a user. The electronic device then controls the signal sent to the earbud based on this information, i.e. the signal is controlled to optimize the functionality of the earbuds. In other words, an electronic device for controlling the functionality of the earbuds is provided.

The signal may also be controlled based on information in the electronic device. If, for example, a call is incoming to the electronic device the signal to the first earbud is changed to a ringtone to indicate to the user that a call is incoming. The ringtone may be sent using mono or stereo depending on if the user is using both earbuds.

Figure 2A:
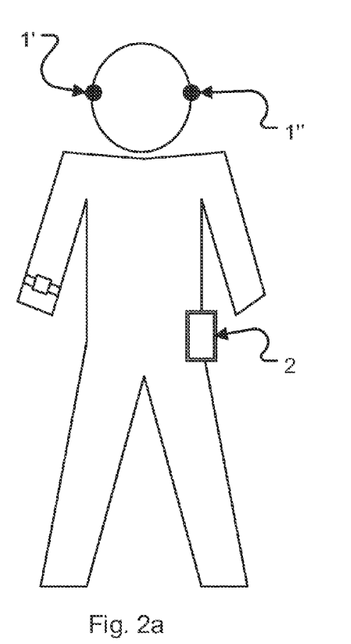
FIG. 2a-d illustrates different examples of a user using earbuds and an electronic device and a wearable.
Figure 2B:
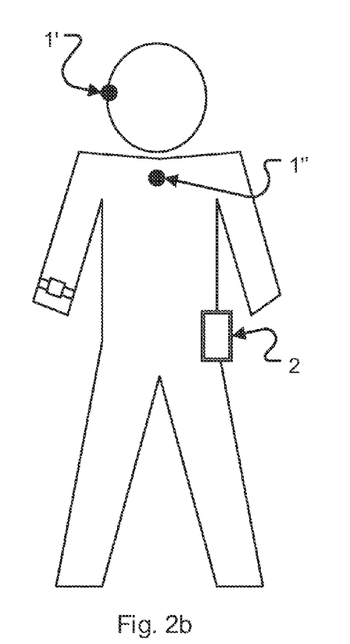
Figure 2C:
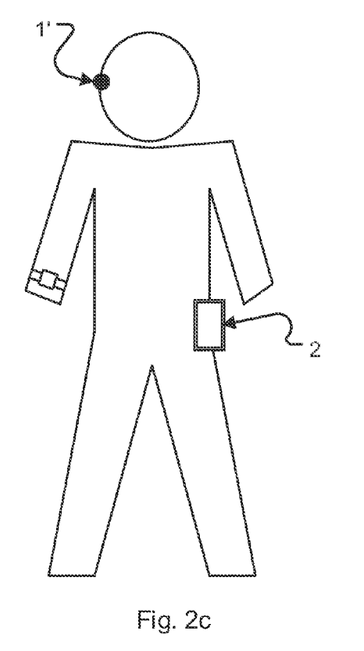
Figure 2D:
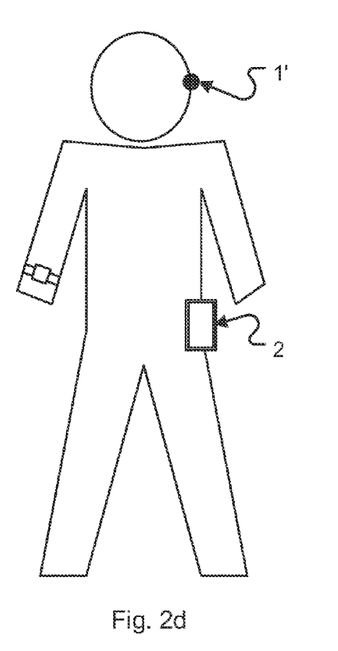

According to some aspects, if the user removes one of the earbuds during an incoming call to the electronic device the first earbud sends information to the electronic device that the earbud is removed and the electronic device then send a signal to the first earbud with information to set the functionality of the removed earbud to a microphone and the first earbud to a mono-earbud. There are several different ways to implement this. One example is to use the previously discussed body recognising sensor to detect that one of the earbuds is removed from the ear of a user and if this is done during an incoming call the signal from the electronic device will indicate to the first earbud that the functionality of the removed earbud is to be a microphone. The signal sent from the microphone earbud is either sent by BCC or Bluetooth or by wire to the first earbud or directly to the electronic device. FIGS. 1e, 1f and 2b illustrate examples where one earbud is used as a microphone. In the case of 1e and 1f, the earbuds are connected to each other by wire. Another example of implementation is to use a gyroscope and/or accelerometer in the earbuds to detect if one of the earbuds are dropped from an ear to be used as a microphone. Note that the functionality of using one earbud as a microphone and the other as a speaker will work regardless of if the earbuds are wireless or wired.

According to some aspects, the functionality of the pair of earbuds comprises that the first earbud receives a stereo audio signal, decodes the signal into two channels of which one sent to a speaker in the first earbud and the other is sent to the second earbud using BCC. In other words, the functionality is set to be the same as for a pair of headphones for reproducing sound but the channel sent to the second earbud is sent using BCC. Sending the signal using BCC is power saving. If the second earbud is only equipped with BCC technology and not for example Bluetooth it is also cost efficient since BCC technology is much cheaper, as previously discussed. In this case the information associated with the functionality of the pair of earbuds, which is sent from the electronic device, comprises instructions to set the functionality of the first earbud and the second earbud to reproduce sound from a signal in stereo. It should be noted that the instructions may be the stereo signal that the electronic device intends for the earbuds to play, the electronic device then assumes that the earbuds will interpret the signal as instructions to play the signal in stereo using both earbuds.

According to some aspects, the functionality of the pair of earbuds comprises that the first earbud or second earbud reproduces sound from a received signal in mono. If only one earbud is inserted, power is saved by only reproducing sound in one of the earbuds. In this case the information associated with the functionality of the pair of earbuds, which is sent from the electronic device, comprises instructions to set the functionality of the first earbud or second earbud to reproduce sound from a received signal in mono. It should also here be noted that the instructions may be the mono signal that the electronic device intends for one of the earbuds to play, the electronic device then assumes that the first earbud will interpret the signal as instructions to play the signal in mono using one earbud.

According to some aspects, the functionality of the pair of earbuds comprises that the first earbud receives a mono audio signal and sends it to a speaker in the first earbud and the second earbud converts sound into a signal that is sent to the first earbud using BCC, the first earbud sends the signal on to the electronic device, whereby the first and the second earbud forms a headset. So the earbuds can be used as a headset by using one of the earbuds as a speaker. In this case the information associated with the functionality of the pair of earbuds, which is sent from the electronic device, comprises instructions to set the functionality of the first earbud to reproduce sound from a received signal in mono and of the second earbud to convert sound into a signal that is sent to the electronic device, whereby the first and the second earbud forms a headset. In other words, this is the case as previously discussed where one earbud is used as a microphone. As discussed, this may be preluded by that one earbud is removed from the ear of a user during an incoming call to the electronic device.

According to some aspects, the functionality of the pair of earbuds comprises that the second earbud receives a mono audio signal and sends it to a speaker in the second earbud and the first earbud converts sound into a signal that is sent to the second earbud using BCC, the second earbud sends the signal on to the electronic device, whereby the first and the second earbud forms a headset. So, same as before, the earbuds can be used as a headset by using one of the earbuds as a speaker. In this case the information associated with the functionality of the pair of earbuds, which is sent from the electronic device, comprises instructions to set the functionality of the second earbud to reproduce sound from a received signal in mono and of the first earbud to convert sound into a signal that is sent to the electronic device, whereby the first and the second earbud forms a headset. This is the same case as the one in the previous paragraph but with the difference that the first earbud acts as a microphone. This is so that the user does not have to keep track of which earbud to use as a microphone. According to some aspects, if the first earbud is removed during an incoming call the role of first earbud will not switch to the second earbud.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented according to some aspects by a computer program, comprising computer readable code which, when run on an electronic device, causes the electronic device to perform the method according to above. The computer program, embodied in a computer-readable medium, includes computer-executable instructions, such as program code, executed by computers in networked environments. A computer-readable medium may include removable and non-removable storage devices 23 including, but not limited to, Read Only Memory, ROM, Random Access Memory, RAM, compact discs, CDs, digital versatile discs, DVD, etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method performed in a first earbud of a pair of earbuds for controlling the functionality of the pair of earbuds, the method comprising:
    detecting, using a body recognizing sensor, direct contact between the first earbud and the body of a user of the first earbud, wherein an earbud of the pair of earbuds that first detects direct contact with the body is assigned as the first earbud;

establishing a connection between the first earbud and an electronic device;

searching for the second earbud of the pair of earbuds using Body Coupled Communication (BCC); and sending a signal from the first earbud to the electronic device, the signal comprising information defining whether the first earbud detected the second earbud during the search.

2. The method according to claim 1, wherein the step of establishing a connection between the first earbud and an electronic device comprises that the connection is a Bluetooth connection or BCC connection.

3. The method according to claim 1, wherein the first earbud acts as a BCC master and the second earbud acts as a BCC client.

4. The method according to claim 3, wherein the second earbud will act as a BCC master if the direct contact between the first earbud and the body of the user is broken.

5. The method according to claim 1, comprising the steps of:

receiving from the electronic device, a signal comprising information associated with the functionality of the pair of earbuds;

controlling the functionality of the pair of earbuds based on the received signal from the electronic device.

6. The method according to claim 5, wherein the functionality of the pair of earbuds comprises that the first earbud receives a stereo audio signal, decodes the signal into two channels of which one sent to a speaker in the first earbud and the other is sent to the second earbud using BCC.

7. The method according to claim 5, wherein the functionality of the pair of earbuds comprises that the first earbud or second earbud reproduces sound from a received signal in mono.

8. The method according to claim 5, wherein the functionality of the pair of earbuds comprises that the first earbud receives a mono audio signal and sends it to a speaker in the first earbud and the second earbud converts sound into a signal that is sent to the first earbud using BCC, the first earbud sends the signal on to the electronic device, whereby the first and the second earbud forms a headset.

9. The method according to claim 5, wherein the functionality of the pair of earbuds comprises:

the second earbud receives a mono audio signal and sends it to a speaker in the second earbud, and the second earbud sends the signal on to the electronic device; and the first earbud converts sound into a signal that is sent to the second earbud using BCC, whereby the first and the second earbud forms a headset.

10. A first earbud of a pair of wireless earbuds, for controlling the functionality of the pair of earbuds, comprising:

communication circuitry for short distance communication; and processing circuitry configured to:
  detect, using a body recognizing sensor, direct contact between the first earbud and the body of a user of the first earbud, wherein an earbud of the pair of earbuds that first detects direct contact with the body is assigned as the first earbud;
  establish a connection, using the communication circuitry, between the first earbud and an electronic device;
  search for the second earbud of the pair of earbuds using Body Coupled Communication (BCC) of the communication circuitry; and
  send a signal, using the communication circuitry, from the first earbud to the electronic device, the signal comprising information defining whether the first earbud detected the second earbud during the search.

11. The first earbud according to claim 10, wherein the processing circuitry is configured to:

receive from the electronic device, a signal, using the communication circuitry, comprising information associated with the functionality of the pair of earbuds;

control the functionality of the pair of earbuds based on the received signal from the electronic device.

* * * * *